United States Patent [19]

Yeh

[11] Patent Number: 5,364,257
[45] Date of Patent: Nov. 15, 1994

[54] MIDDLE SOLE SLOPING MACHINE WITH LENGTH/WIDTH ADJUSTABLE ROLLS

[76] Inventor: Ten F. Yeh, No. 53, Alley 87, Lane 538, Sec. 4, An Ho Rd., Tainan, Taiwan, Prov. of China

[21] Appl. No.: 133,620
[22] Filed: Oct. 7, 1993
[51] Int. Cl.⁵ .......................... B29C 53/00; B29D 7/00
[52] U.S. Cl. .................................. 425/367; 100/168; 425/363; 425/368; 425/DIG. 127
[58] Field of Search ............... 425/363, 366, 367, 368, 425/DIG. 127; 100/93 RP, 168, 171, 176

[56] References Cited

U.S. PATENT DOCUMENTS

| | | | |
|---|---|---|---|
| 1,114,572 | 10/1914 | Barcus | 425/368 |
| 3,670,644 | 6/1972 | Hoever et al. | 100/168 |
| 3,856,462 | 12/1974 | Mueller | 100/168 |
| 3,871,808 | 3/1975 | Ancker | 425/368 |
| 4,171,942 | 10/1979 | Missenard | 425/367 |
| 5,061,337 | 10/1991 | Fraser | 425/367 |

Primary Examiner—James Mackey
Attorney, Agent, or Firm—Omri M. Behr; Matthew J. McDonald

[57] ABSTRACT

A middle sole sloping machine includes a base plate, upper and lower rolls each including first and second roll sections and a flexible sloping section which connects the first and second roll sections, a fixed mount plate and a movable mount plate extending upward from the base plate, the movable mount plate being movable relative to the fixed mount plate in a direction parallel to the extending direction of the upper and lower rolls, a device for effecting relative movements between the fixed and movable mount plates along the extending direction of the upper and lower rolls, a second device for effecting vertical movements of the first and second roll sections of the upper and lower rolls, and a third device for rotating the upper and lower rolls.

7 Claims, 8 Drawing Sheets

MIDDLE SOLE SLOPING MACHINE WITH LENGTH/WIDTH ADJUSTABLE ROLLS

BACKGROUND OF THE INVENTION

1. Field of the Invention

The present invention relates to a middle sole sloping machine including rolls which are adjustable both in length and width to manufacture middle soles of various dimensions.

2. Description of related art

Middle soles generally include two types: the so-called "semiinsert" type and "full-insert" type, each type having various specifications when used to make different kinds of shoes. Each specification of the middle soles is further classified into dozens of dimensions according to different sizes. The middle soles are formed by a pair of rolls with a cone section in a mediate section thereof, and the middle sole material therein is cut from the central line thereof, thereby obtaining two middle sole pieces. However, due to the diversification of the dimensions of the middle soles, manufacturing of middle soles becomes a high-cost and time-consuming job as dozens of correspondingly shaped roll pairs are required and a roll pair on the sloping machine must be replaced by another roll pair of a different dimension for next batch after having finished manufacturing of middle soles of the present batch.

Therefore, there has been a long and unfulfilled need for an improved middle sole sloping machine with a pair of length/width adjustable rolls to mitigate and/or obviate the above-mentioned problems.

SUMMARY OF THE INVENTION

The invention provides a middle sole sloping machine which includes a base plate, upper and lower rolls each including first and second roll sections and a flexible sloping section which connects the first and second roll sections, a fixed mount plate and a movable mount plate extending upward from the base plate, the movable mount plate being movable relative to the fixed mount plate in a direction parallel to the extending direction of the upper and lower rolls, a first device for effecting relative movements between the fixed and movable mount plates along the extending direction of the upper and lower rolls thereby changing the length of the sloping section of the middle sole, a second device for effecting vertical movements of the first and second roll sections of the upper and lower rolls thereby changing the widths of both ends of the middle sole, and a third device for rotating the upper and lower rolls.

By such an arrangement, both the lengths and widths of the sloping sections of the upper and lower rolls are adjustable to form middle soles of various dimensions without troublesome replacement of roll pairs in the prior art and further avoiding expensive cost for the dozens of roll pairs required in the prior art.

Other objects, advantages, and novel features of the invention will become more apparent from the following detailed description when taken in conjunction with the accompanying drawings.

DESCRIPTION OF THE PREFERRED EMBODIMENT

Figure 12:
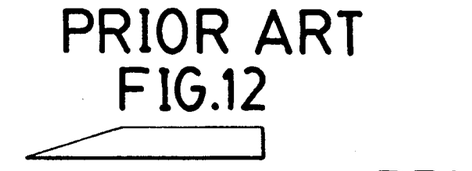
FIG. 12 is a schematic view of a so-called "semiinsert" type middle sole according to prior art.
Figures 13, 14, 15:
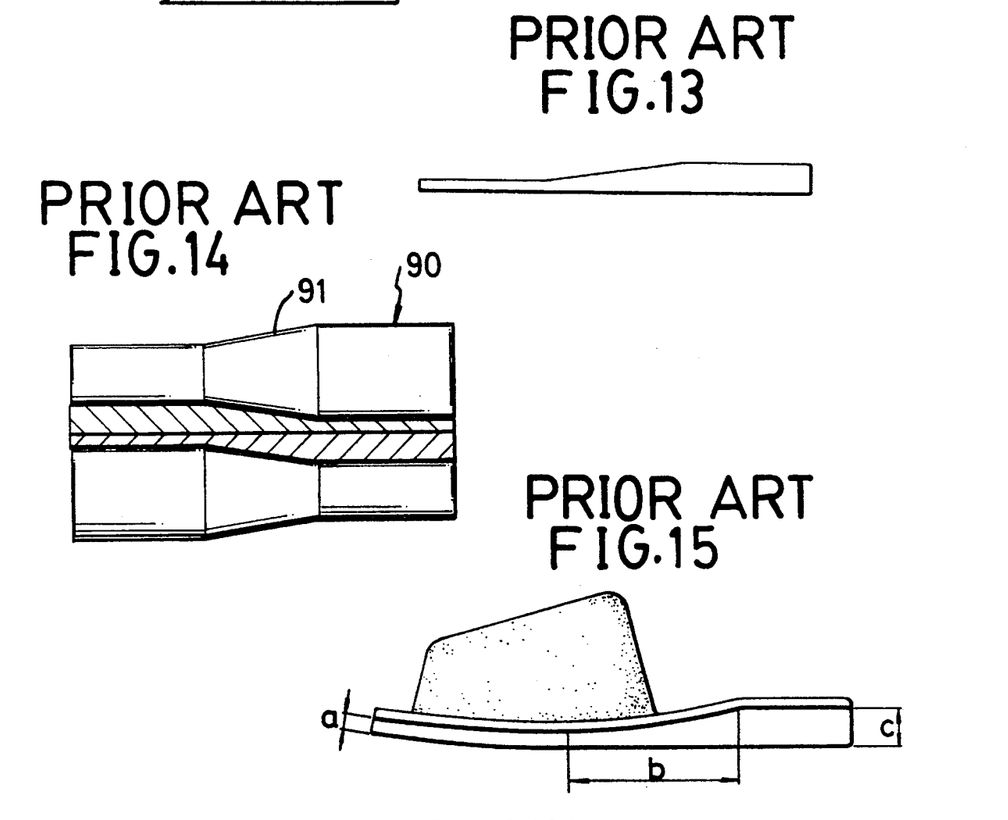
FIG. 13 is a schematic view of a so-called "full-insert" type middle sole according to prior art.
FIG. 14 is a schematic view illustrating a pair of conventional rolls for forming the middle sole of "full-insert" type.
FIG. 15 is a side view of a slipper.
Figure 16:
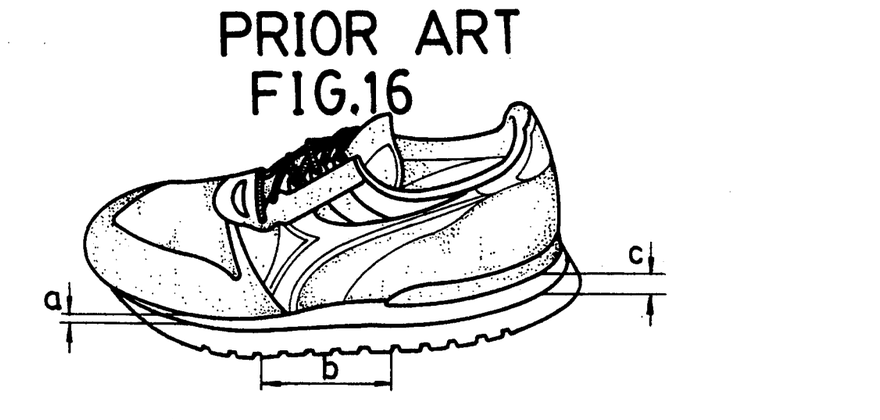
FIG. 16 is a perspective view of a sport shoe.

Referring to the drawings and initially to FIGS. 12 through 16 which illustrate the state of the art in the sloping machine for middle soles. The middle soles illustrated in FIGS. 12 and 13 are respectively called as "semiinsert" type and "full-insert" type each have various specifications when used to make different kinds of shoes. For example, as shown in FIGS. 15 and 16, the middle sole used in slippers differs from that used in sport shoes- Each specification of the middle soles are further classified into dozens of dimensions according to different sizes. Taking the middle sole of the slipper in FIG. 15 for example, the height "a" of the front section ranges from 3-15 mm, the height "c" of the rear section ranges from 10-30 mm, and the length of the sloping section "b" ranges from 60-120 mm. Same situation exists in the middle sole for sport shoes and other kinds of shoes. The middle soles are formed by a pair of rolls 90 with a cone section 91 in a mediate section thereof, as shown in FIG. 14, the middle sole material therein is cut from the central line thereof, thereby obtaining two middle sole pieces. However, due to the diversification of the dimensions of the middle soles, manufacturing of middle soles becomes a high-cost and time-consuming job as the manufacturers must produce dozens of correspondingly shaped roll pairs and a roll pair on the sloping machine must be replaced by another roll pair of a different dimension for next batch after having finished manufacturing of middle soles of the present batch.

In view of the above drawbacks, the applicant provides an improved sloping machine which includes a pair of length/width adjustable rolls.

Figure 1:
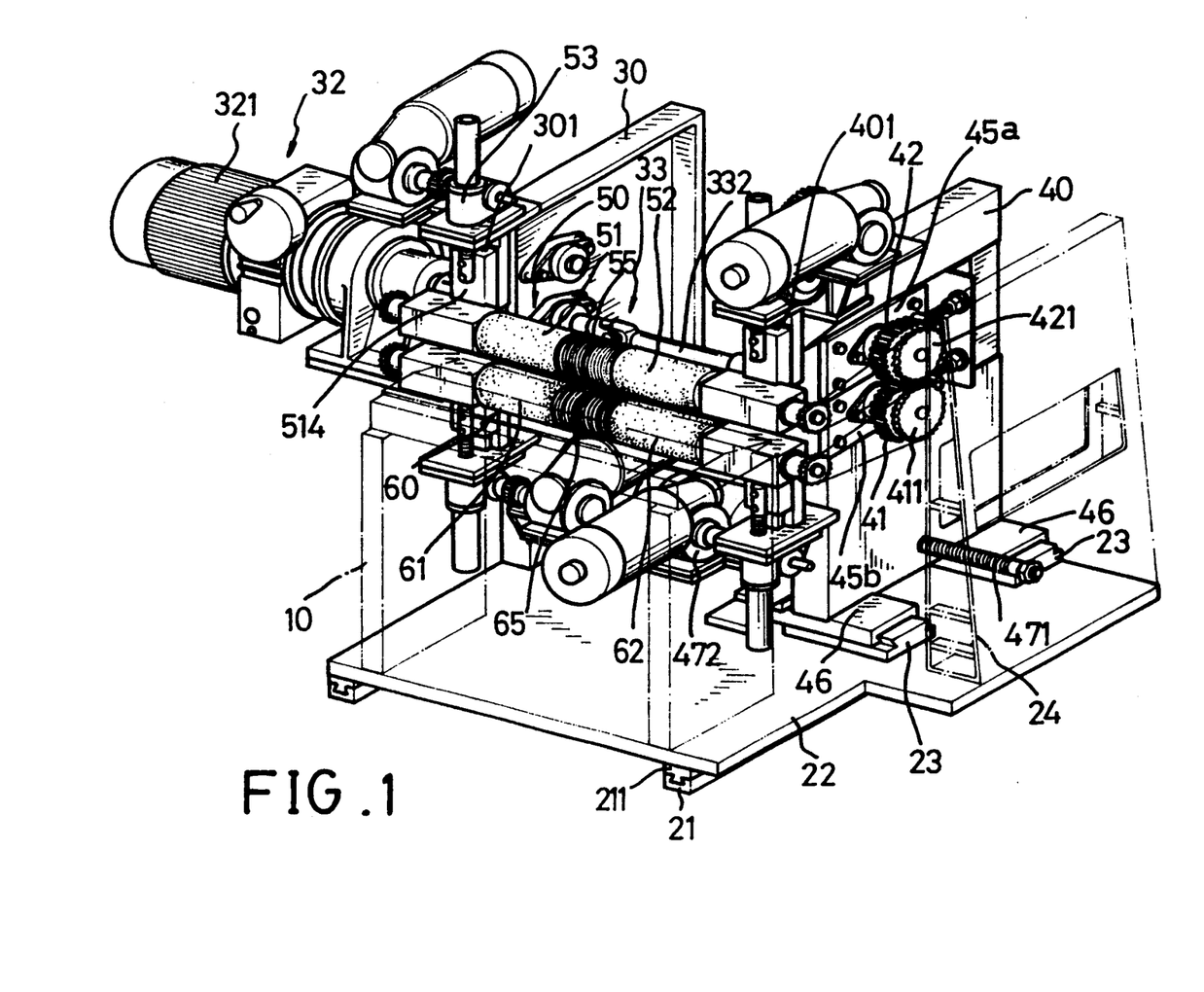
FIG. 1 is a perspective view of a middle sole sloping machine in accordance with the present invention, the frame portion and the cutter assembly being omitted for clarity.
Figure 2:
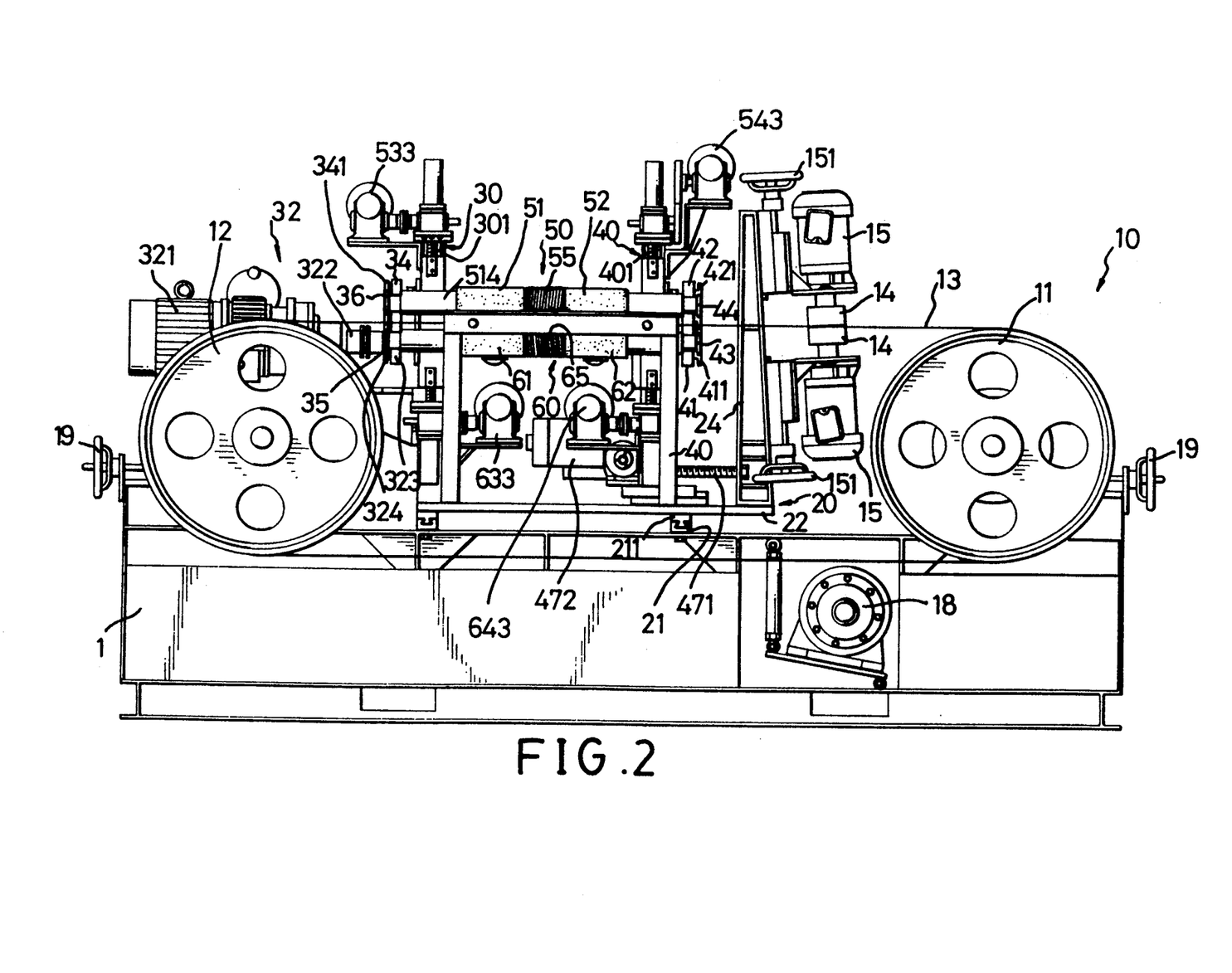
FIG. 2 is a front elevational view of the middle sole sloping machine in accordance with the present invention.
Figure 3:
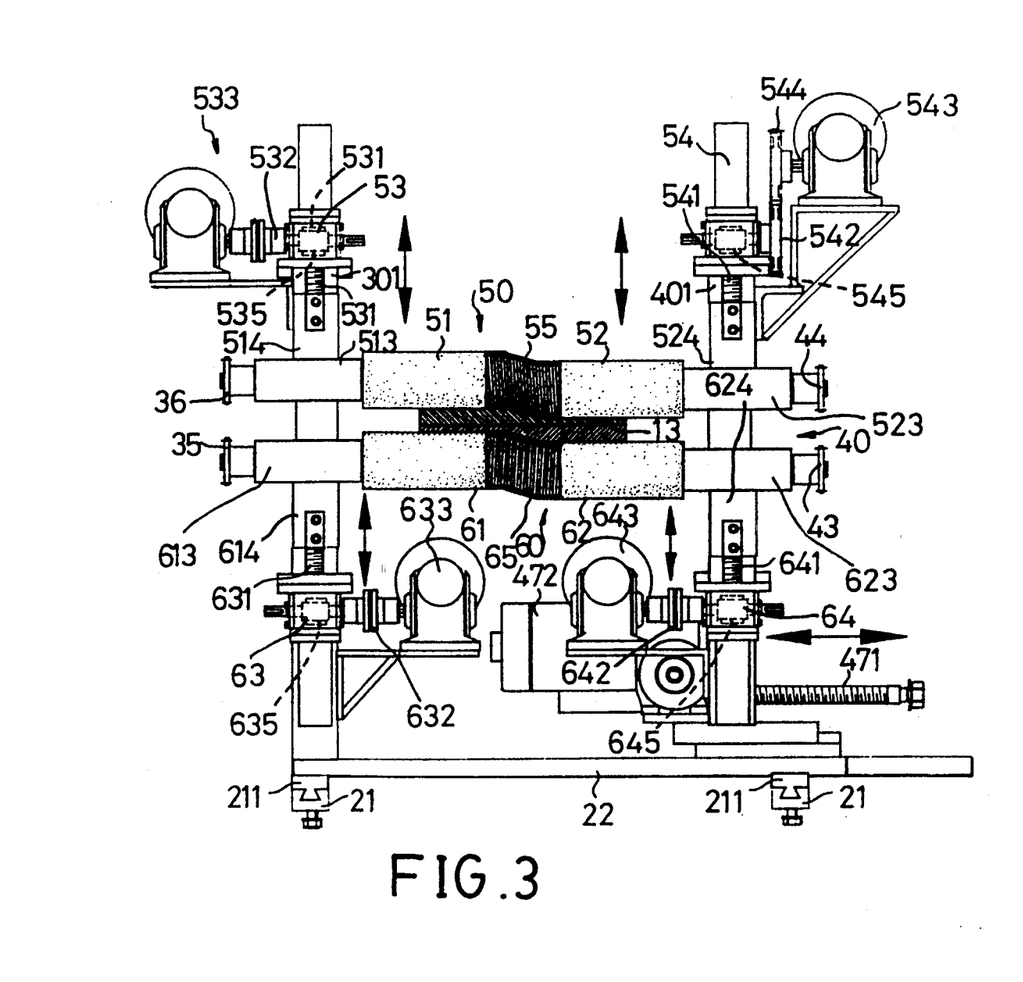
FIG. 3 is a front elevational view of the middle sole sloping machine in FIG. 1, the frame portion and the cutter assembly being omitted for clarity.

Referring now to FIGS. 1 through 3, a middle sole sloping machine includes a frame 1, a base assembly 20 movably mounted on the frame 1, and a cutter assembly 10 located in front of the base assembly 20 (see the direction of FIG. 1, the middle sole material is fed from the rear side to the front side of the sloping machine). As shown in FIG. 2, an endless belt type cutter 13 is mounted around a pair of cutter wheels 11 and 12 which are respectively disposed on two sides of the cutter seat 10 and activatable by a driving means 18. An adjusting means 19 is provided to each cutter wheel 11, 12 to adjust the distance between the cutter wheels 11 and 12, thereby adjusting the tightness of the cutter 13. A pair of grinding stones 14 are provided to the cutter 13, each grinding stone 14 being driven by a motor 15 and being adjustable in vertical position by a wheel device 151. The cutter seat 10 and corresponding cutter arrangements are conventional and thus are not further described.

Figures 4, 7:
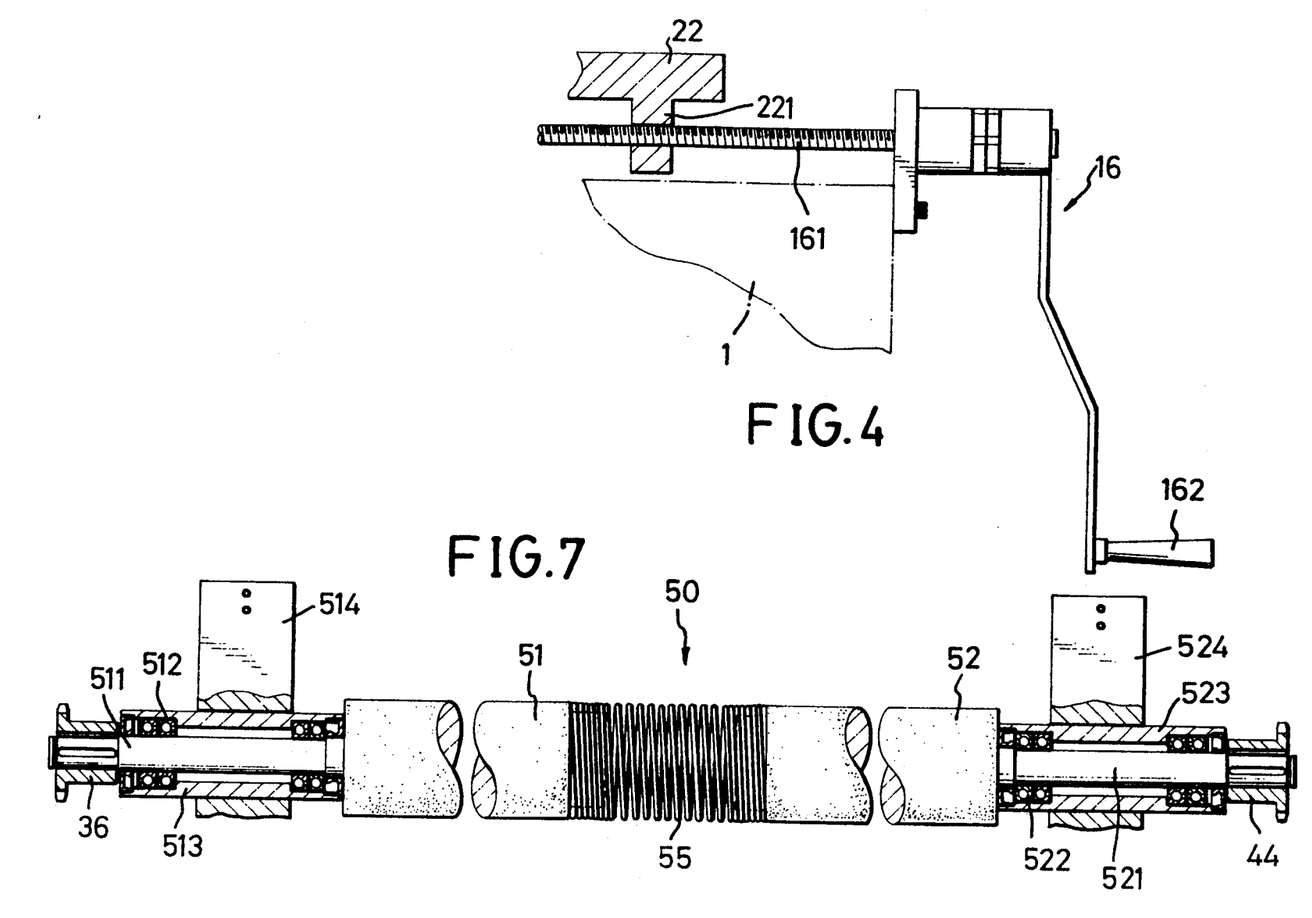
FIG. 4 is a partly-sectioned partial schematic view illustrating the rocker lever for operating the base plate of the middle sole sloping machine.
FIG. 7 is a side view, partly sectioned, of the upper roll of the middle sole sloping machine.

The movable base assembly 20 includes a base plate 22 which is movable relative to the fixed frame 1 by the provision of a first dovetail track means consisting of a pair of spaced first track members 211 on an underside of the base plate 22 and a pair of correspondingly shaped second track members 21 mounted on the frame 1. Referring to FIG. 4, a ratchet-type rocker lever 16 is secured to the frame 1 and is coupled to an extension 221 which extends downwardly from an underside of the base plate 22 and which includes a threaded hole (not labeled) to receive an adjusting bolt 161 rotationally drivable by the rocker lever 16. Under operation of a rocker handle 162 of the rocker lever 16, the adjusting bolt 161 rotates to urge the base plate 22 to slide along the second track elements 21, thereby adjusting the distance between the cutter 13 and the rolls 50 and 60 on the base assembly 20. It is appreciated that other types of actuating means can be used to effect the sliding movement of the base plate 22 relative to the frame 1 to effect the cutting of the middle sole material between the rolls 50 and 60.

Still referring to FIGS. 1 through 3, a fixed mount plate 30 and a movable mount plate 40 extend upward from an upper side of the base plate 22. Mount plate 40 is movable relative to the fixed mount plate 30 by the provision of a second dovetail track means including two spaced third track members 46 securely attached to the bottom side of the mount plate 40 and two correspondingly shaped fourth track members 23 secured on the base plate 22. As can be seen in FIG. 1, the dovetail track means extends in a longitudinal direction of a pair of vertically spaced rolls 50 and 60 which are rotatably mounted between the mount plates 30 and 40. An adjusting bolt 471 is mounted to a bolt hole 47 in the lower section of the movable mount plate 40 and has one end attached to and thus rotationally driven by a reduction motor 472, thereby controlling sliding movement of the movable mount plate 40 relative to the fixed plate 30, the purpose of which will be disclosed later.

Referring to FIG. 7, the upper roll 50 includes a first axle section 511 which is rotatably mounted in a first tubular member 513 by a bearing means 512, a second axle section 521 which is rotatably mounted in a second tubular member 523 by a bearing means 522, a first roll section 51 secured to a first end of the first axle section 511 to rotate therewith, a second roll section 52 secured to a first end of the second axle section 521 to rotate therewith, and a flexible member, such as a spring 55, mounted between the roll sections 51 and 52. Sprockets 36 and 44 are respectively mounted on second ends of first and second axle sections 511 and 521 to rotate therewith.

Referring to FIG. 3, the first tubular member 513 has a first sliding seat 514 secured thereto which is slidably engaged to a correspondingly shaped fixed seat 301 which, in turn, is secured to the fixed mount plate 30, thereby allowing vertical movement of the first sliding seat 514 along fixed seat 301. A first elevator means 53 is provided to carry the first sliding seat 514 in the vertical direction and includes a reduction motor 533, a vertical screw rod 531 which is secured to an upper section of the first sliding seat 514 to move therewith, and a horizontal screw rod 535-which is coupled to and thus driven by the reduction motor 533 via a coupling 532 and which meshes with the vertical screw rod 531. By such an arrangement, when the reduction motor 533 operates, the vertical screw rod 531 moves vertically and thus carries the first sliding seat 514 together with the first roll section 51 to move vertically.

Similarly, the second tubular member 523 has a second sliding seat 524 secured thereto which is slidably engaged to a correspondingly shaped second fixed seat 401 which, in turn, is secured to the movable mount plate 40, thereby allowing vertical movement of the second sliding seat 524 along the second fixed seat 401. A second elevator means 54 is provided to carry the second sliding seat 524 in the vertical direction and includes a second reduction motor 543, a second vertical screw rod 541 which is secured to an upper section of the second sliding seat 524, and a second horizontal screw rod 545 which is coupled to the second reduction motor 543 via a coupling 542 and which meshes with the vertical screw rod 541. By such an arrangement, when the second reduction motor 543 operates, the vertical screw rod 541 moves vertically and thus carries the second sliding seat 524 together with the second roll section 52 to move vertically.

The lower roll 60 has a structure identical to that of the upper roll 50 except that the reference numerals representing the associated parts are led by reference numeral "6" instead of "5". Similarly, the elevating means 63 and 64 for respectively adjusting the vertical positions of the first and second roll sections 61 and 62 of the lower roll 60 have a structure identical to that of the first and second elevating means 53 and 54 except that the reference numerals representing the associated parts are led by reference numeral "6" instead of "5".

Figure 5:
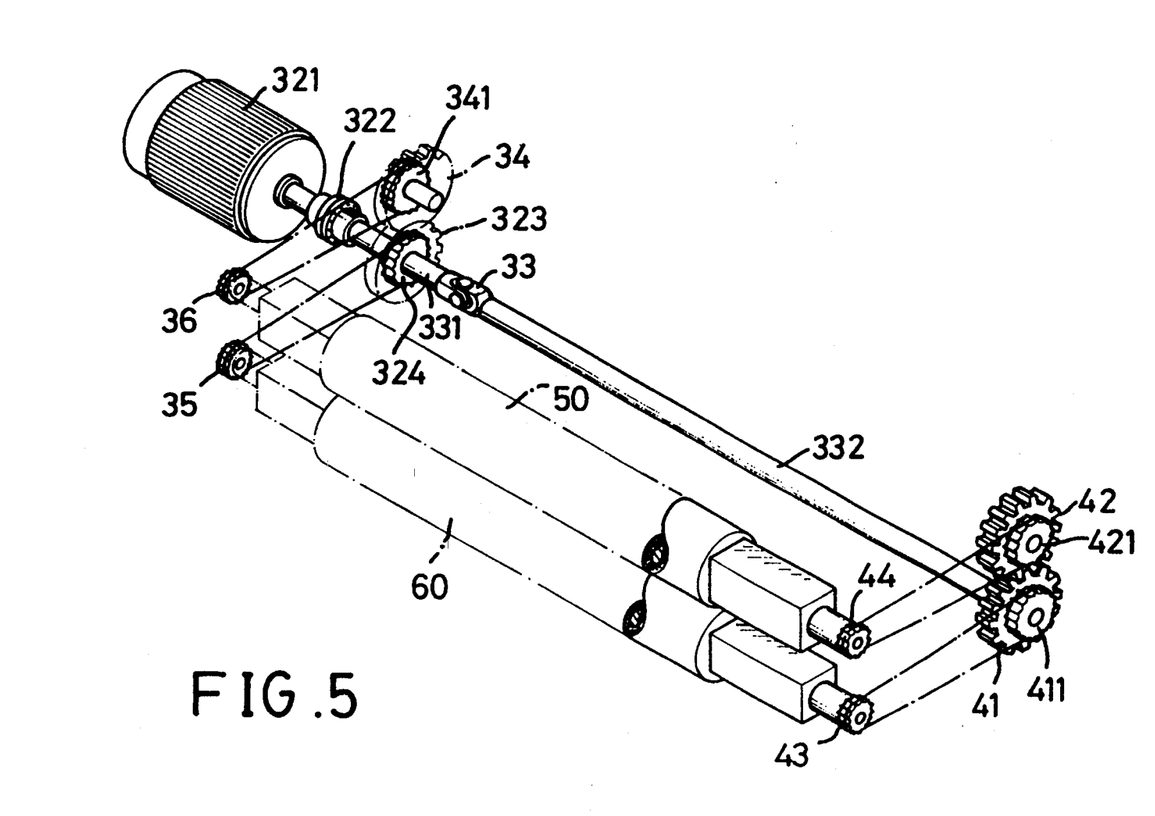
FIG. 5 is a perspective view illustrating the transmission assembly for the rolls of the sloping machine.

Still referring to FIGS. 1 through 3 and further to FIG. 5, the driving assembly and transmission assembly for rotating the rolls 50 and 60 to effect the forming of the middle sole include a driving means 32 including a motor 321 with a stepless speed change device whose output shaft (not labeled) drives a coupling 322 which, in turn, couples a first axle section 331 which couples a second axle section 332 via a universal joint 33. Alternatively, the first and second axle sections 331 and 332 together with the universal joint 33 can be replaced by a single transmission shaft.

Gear 323 and sprocket 324 are mounted on the first axle section 331 with sprocket 324 connecting with a sprocket 35 on the first axle section 611 of the lower roll 60 via a chain (not labeled). Gear 41 and sprocket 411 are mounted on the second axle section 332 with sprocket 411 connecting with another sprocket 43 on the second axle section 621 of the lower roll 60 via a chain (not labeled)- Gear 323 meshes with a gear 34 which together with a sprocket 341 are rotatably mounted to the fixed mount plate 30 by a common shaft (not labeled). Sprocket 341 connects with sprocket 36 on the first axle section 511 of the upper roll 50 via a chain (not labeled). Gear 41 meshes with another gear 42 which together with a sprocket 421 are rotatably mounted to the movable mount plate 40 by a cotton shaft (not labeled). Sprocket 421 connects sprocket 44 on the second axle section 521 of the upper roll 50. By such an arrangement, when the motor 321 operates, the rolls 50 and 60 rotate upon transmission of the transmission assembly, thereby effecting the forming of the middle sole.

Figure 6:
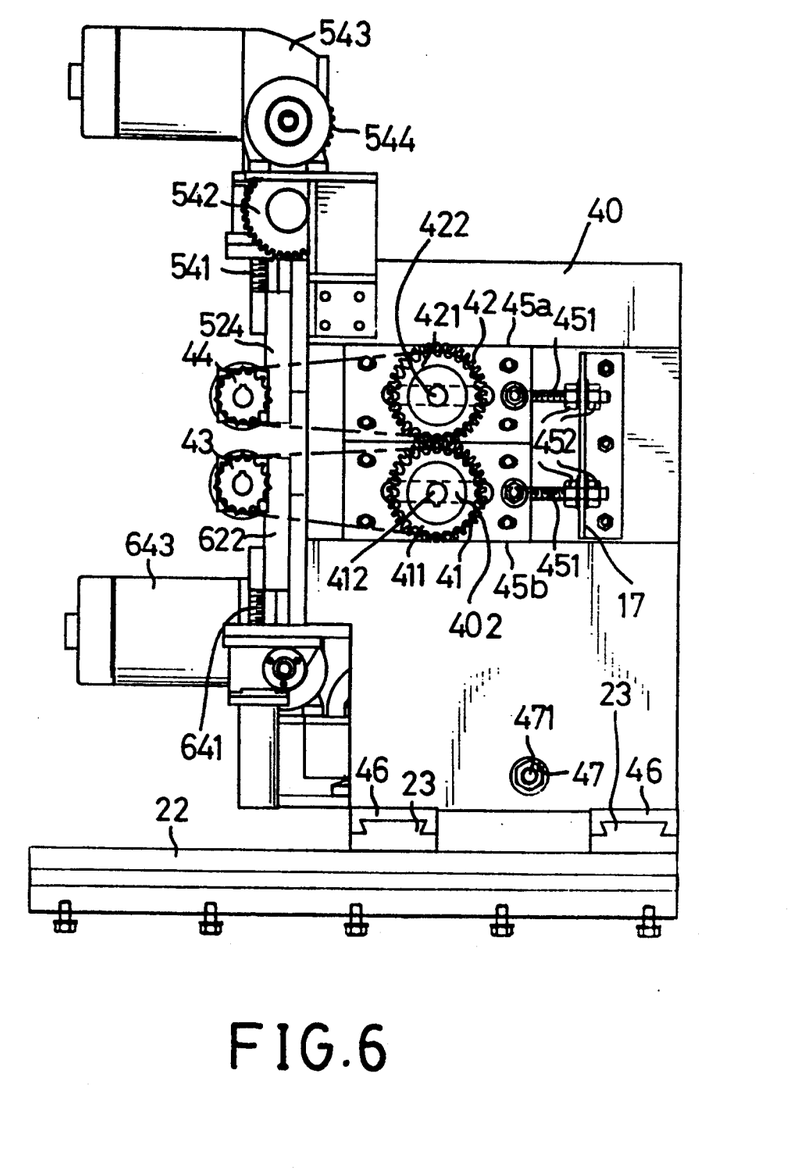
FIG. 6 is a right side elevational view of the middle sole sloping machine in FIG. 1.

Referring to FIGS. 1, 5, and 6, gear 41 together with sprocket 411 are mounted on a lower seat 456 which is slidably mounted to the movable mount plate 40 which, in turn, has an elongate hole 402 extending along the longitudinal direction thereof, such that the common axle 412 of gear 41 and sprocket 411 may move along the elongate hole 402 upon movement of the slidable lower seat 456 relative to the movable mount plate 40 under operation of an associated adjusting screw 451 a first end of which is securely attached to the lower seat 45b to move therewith and a second end of which is mounted, by two nuts 452, to a positioning plate 17, which, in turn, is mounted to the frame 1. Similarly, gear 42 together with sprocket 421 are mounted on an upper seat 45a which is slidably mounted to the movable mount plate 40 which, in turn, has a second elongate hole (not labeled) extending along the longitudinal direction thereof, such that the con, non axle 422 of gear 42 and sprocket 421 may move along the second elongate hole upon movement of the slidable upper seat 45a relative to the movable mount plate 40 under operation of an associated adjusting screw 451 a first end of which is securely attached to the upper seat 45a to move therewith and a second end of which is mounted by two nuts 452, to the positioning plate 17. This arrangement allows the user to adjust the distance between the sprockets 44 and 421; 43 and 411, thereby adjusting the tightness of the chains mounted therearound after having adjusted horizontal and/or vertical positions of the second roll sections 52 and 62. Same arrangement is provided to the fixed mount plate 30 to allow adjustments of the tightness of the chains mounted around sprockets 36 and 341; 324 and 35 after having adjusted horizontal and/or vertical positions of the first roll sections 51 and 61.

Operation

Figures 8, 9, 10, 11:
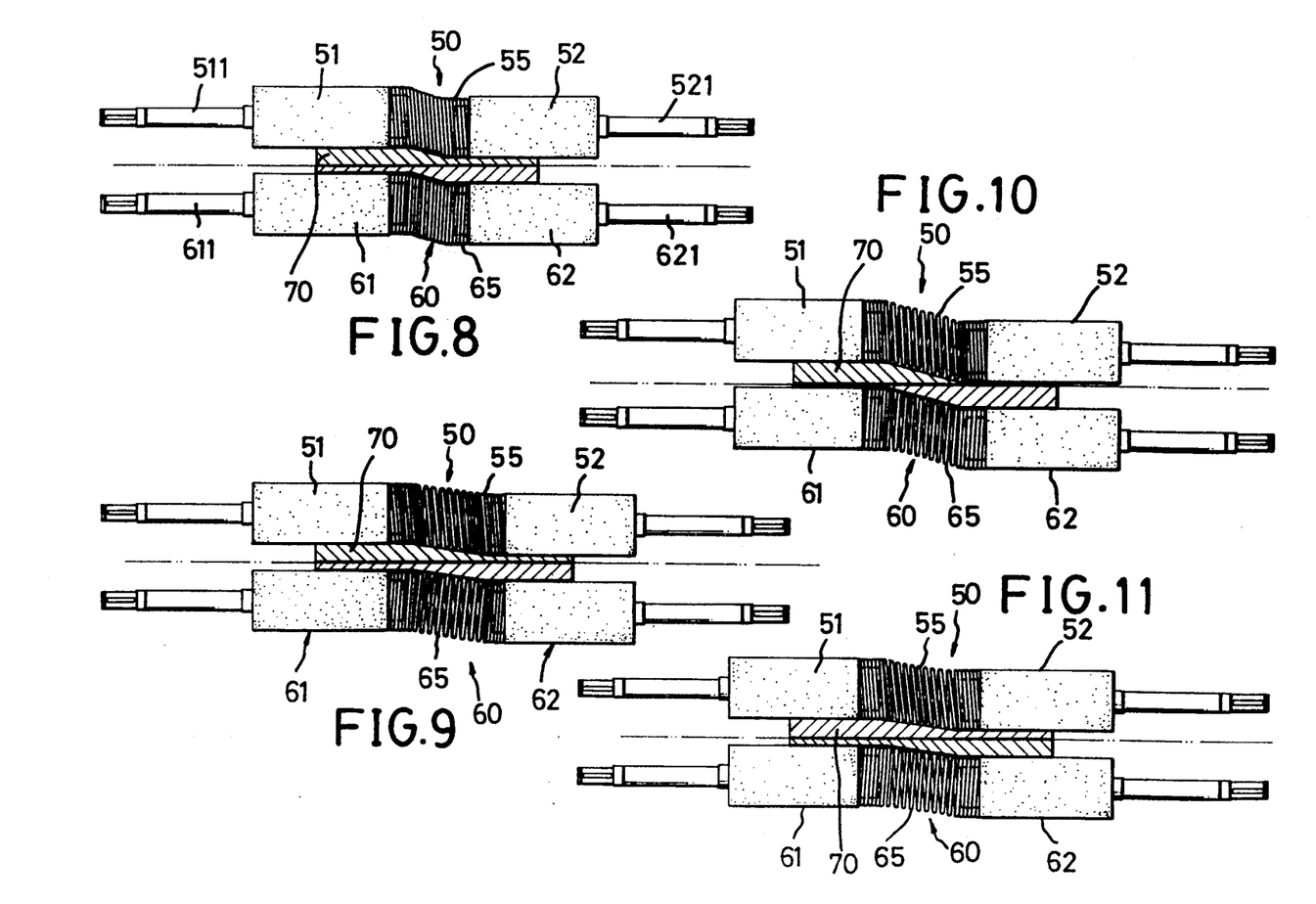
FIG. 8 is a side view illustrating a pair of rolls for forming the middle sole.
FIGS. 9 through 11 are schematic views illustrating adjustment of the rolls in response to the change of the dimension of the middle sole.

Referring now to FIGS. 5 and 8, when the motor 321 operates, the rolls 50 and 60 rotate to form the middle sole 70, and the cutter 13 cuts the middle sole 70 from its central line after the formation. When a batch of middle soles of a specific dimension is finished, the width and/or height of the sloping section of the middle sole is changed to manufacture middle soles of a different size. FIG. 9 shows the change of the length of the sloping section of the middle sole 70 by the sliding movements of the movable mount plate 40 relative to the fixed plate 30 under operation of motor 472. FIG. 10 shows the change of the widths of both ends of the middle sole 70 by the vertical movements of the first and second roll sections 51, 52, 61, and 62 of the upper and lower rolls 50 and 60 under operation of the elevator means 53, 54, 63, and 64. FIG. 11 shows the change both in length and width upon operation of motor 472 and elevator means 53, 54, 63, and 64. The springs 55 and 65 allow such adjustments. Subsequent adjustment of the tightness of the chains are required upon operation of the adjusting screws 451 which has been clearly described hereinbefore.

Accordingly, the present invention provides an improved design in the roll pair, thereby being able to manufacture middle soles of various dimensions under simple operations.

Although the invention has been explained in relation to its preferred embodiment, it is to be understood that many other possible modifications and variations can be made without departing from the spirit and scope of the invention as hereinafter claimed.

I claim:

1. A middle sole sloping machine comprising:
   a base plate;
   upper and lower rolls each comprising first and second roll sections and a flexible sloping section which interconnects the first and second roll sections;
   a fixed mount plate and a movable mount plate extending upward from the base plate, the movable mount plate being movable relative to the fixed mount plate in a direction parallel to the extending direction of the upper and lower rolls, the first roll sections being movably attached to the fixed mount plate, the second roll sections being movably attached to the movable mount plate;
   means for effecting relative movements between the fixed and movable mount plates along the extending direction of the upper and lower rolls;
   means for effecting vertical movements of the first and second roll sections of the upper and lower rolls relative to the flexible sloping sections; and
   means for rotating the upper and lower rolls.

2. The middle sole sloping machine as claimed in claim 1 wherein the flexible sloping sections of the rolls are springs.

3. The middle sole sloping machine as claimed in claim 1 wherein the means for effecting relative movements between the fixed and movable mount plates includes a track means comprising a first track member mounted to the movable mount plate and a second track member mounted to the base plate, the first and second track members extending in the extending direction of the rolls and the first track member being slidably engaged on the second track member, an adjusting screw passing through the movable mount plate and extending in the extending direction of the rolls, and a driving means for rotating the adjusting screw, such that rotational movement of the adjusting screw causes movement of the movable mount plate relative to the fixed mount plate along the extending direction of the rolls.

4. The middle sole sloping machine as claimed in claim 1 wherein each of the upper and lower rolls includes first and second axle sections to which the first and second roll sections are respectively securely attached to rotate therewith, each of the first and second axle sections of the upper and lower rolls being rotatably mounted in a tubular member, and the means for effecting vertical movements of the first and second roll sections of the upper and lower rolls including a track means for each of first and second roll sections of the upper and lower rolls and an elevator means for each of the track means, each of the track means comprising a first vertical track member secured to associated said tubular member to move therewith and a correspondingly shaped second vertical track member secured to the associated mount plate and slidably engaging with the first vertical track member, each of the elevator means including a vertical screw rod which is secured to the first vertical track member to move therewith, a horizontal screw rod engaging with and thus driving the vertical screw rod, and a driving means for driving the horizontal screw rod, whereby rotation of the horizontal screw rods cause vertical movement of the first and second roll sections.

5. The middle sole sloping machine as claimed in claim 4 wherein the driving means is a reduction motor with a coupling for engaging with the horizontal screw rod.

6. The middle sole sloping machine as claimed in claim 4 wherein the means for rotating the upper and lower rolls includes a second driving means, an axle driven by the second driving means, first and second gears respectively mounted on two ends of the axle to rotate therewith, first and second sprockets respectively mounted on the two ends of the axle to rotate therewith, third and fourth gears respectively rotatably mounted to the fixed and movable mount plates and respectively meshing with the first and second gears, third and fourth sprockets respectively concentric with the third and fourth gears to rotate therewith and respectively and rotatably mounted to the fixed and movable mount plate, fifth and sixth sprockets respectively mounted on the first and second axle sections of the lower roll to rotate therewith and respectively connected with the first and second sprockets via a chain, and seventh and eighth sprockets respectively mounted on the first and second axle sections of the upper roll to rotate therewith and respectively connected with the third and fourth sprockets via a second chain.

7. The middle sole sloping machine as claimed in claim 6 wherein each of the first and third sprockets is mounted to a first slidable seat slidingly mounted to the fixed mount plate allowing adjustment of a distance between the third and seventh sprockets and a distance between the first and fifth sprockets, each of the second and fourth sprockets is mounted to a second slidable seat slidingly mounted to the movable mount plate allowing adjustment of a distance between the fourth and eight sprockets and a distance between the second and sixth sprockets.

* * * * *